Dec. 17, 1940.         E. BAGNALL         2,225,364
RADIATOR GRILLE PROTECTOR
Filed Dec. 4, 1937         2 Sheets-Sheet 1
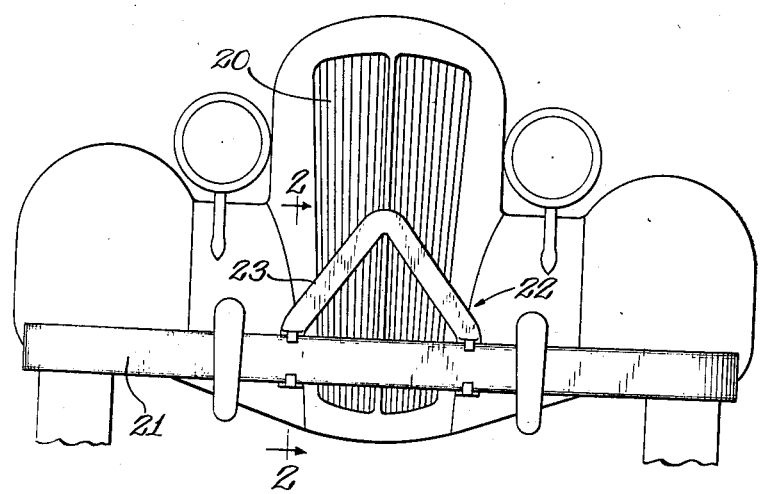
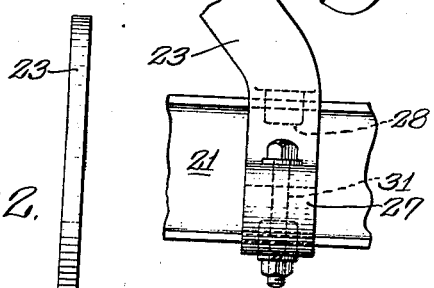
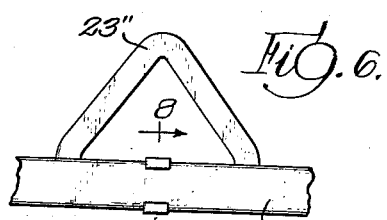
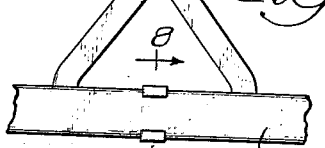
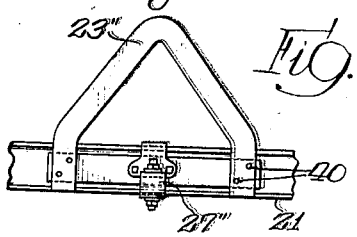
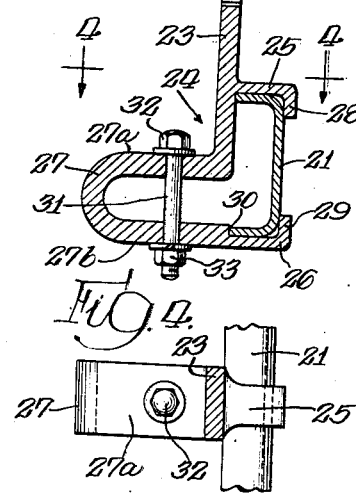
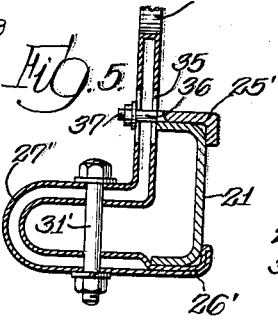
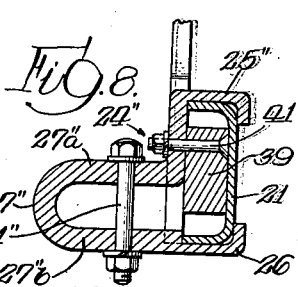
Inventor:
Edwin Bagnall,
By Ernest A. Wegner Atty.

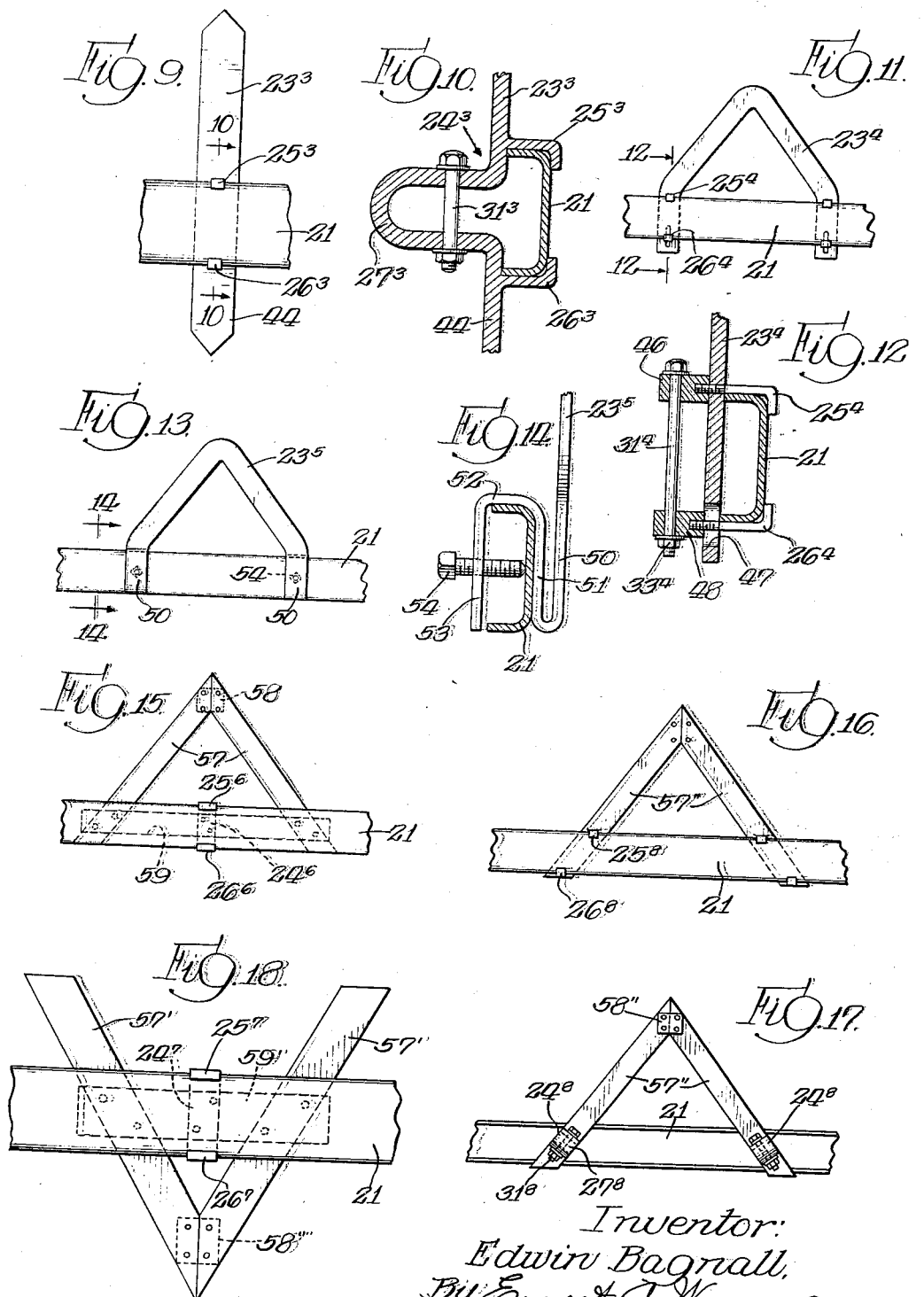

Patented Dec. 17, 1940

2,225,364

UNITED STATES PATENT OFFICE 2,225,364

RADIATOR GRILLE PROTECTOR

Edwin Bagnall, Chicago, Ill.

Application December 4, 1937, Serial No. 178,121

9 Claims. (Cl. 293—55)

The invention relates generally to auxiliary attachments for bumper bars of automotive vehicles and more particularly to a radiator grille protector which is attachable to the bumper bar.

With the placing forward of the engine of an automotive vehicle as a result of the desire of the manufacturers to redistribute the weight of the vehicle, the engine and hence the radiator, and particularly the radiator grille which has been added to enhance the beauty of the vehicle, are so far forward with respect to the front springs and the front bumper bar that the bumper bar no longer affords complete protection for the radiator grille. As a result the radiator grille is frequently damaged even though no damage is done to any other portion of the automotive vehicle.

It is a general object of the invention, therefore, to provide a radiator grille protector of new and improved construction which is sturdy enough to afford real protection yet presents a neat and attractive appearance when applied to the bumper bar.

Another object of the invention is to provide a radiator grille protector having new and improved means for securing the protector to the bumper bar by means of which the protector is conveniently and readily yet securely attached to the bar.

Yet another object is to provide a radiator grille protector having a new and improved construction employing a minimum number of manufacturing operations so that it may be economically produced in finished commercial form.

Still another object is to provide a radiator grille protector having new and improved means for attaching the protector to a bumper bar which means is adjustable to accommodate bars of varying width.

A further object is to perfect a radiator grille protector, attachable to a bumper bar, having a unique securing means including a spring bow.

Still a further object is to perfect a radiator grille protector in which the securing means as well as the main portion of the protector is formed from a single piece of material.

Other objects and advantages will become apparent from the following detailed description taken in connection with the accompanying drawings, in which:

Fig. 1 is a front elevational view of a radiator grille protector embodying the features of the invention as applied to the bumper bar of an automotive vehicle.

Fig. 2 is a view taken along the line 2—2 of Fig. 1, looking in the direction of the arrows.

Fig. 3 is a rear elevational view of a portion of the radiator grille protector.

Fig. 4 is a view taken approximately along the line 4—4 of Fig. 2, looking in the direction of the arrows.

Fig. 5 is a view similar to Fig. 2 but showing a modified form of radiator grille protector.

Fig. 6 is a front elevational view of a modified form of radiator grille protector.

Fig. 7 is a rear elevational view of the protector shown in Fig. 6.

Fig. 8 is a sectional view taken approximately on the line 8—8 of Fig. 6, looking in the direction of the arrows.

Fig. 9 is a front elevational view of another modified form of protector.

Fig. 10 is a fragmental sectional view taken approximately on the line 10—10 of Fig. 9, looking in the direction of the arrows.

Fig. 11 is a front elevational view of still another modified form of protector.

Fig. 12 is a sectional view taken approximately on the line 12—12 of Fig. 11, looking in the direction of the arrows.

Fig. 13 is a front elevational view of yet another form of radiator grille protector.

Fig. 14 is a sectional view taken approximately on the line 14—14 of Fig. 13, looking in the direction of the arrows.

Fig. 15 is a front elevational view of a further modified form of protector.

Fig. 16 is a front elevational view of a further modified form of protector.

Fig. 17 is a rear elevational view of the protector shown in Fig. 16.

Fig. 18 is a front elevational view of a protector similar to that shown in Fig. 15 but having the main portion of the protector inverted.

Referring now to the drawings, particularly Figs. 1 to 4 disclosing the preferred form of the invention, 20 represents the radiator grille of an automotive vehicle, 21 represents a bumper bar attached in conventional manner to the front end of the frame of the vehicle, and 22 represents generally a radiator grille protector embodying the features of the invention. The grille protector comprises generally an effective or exposed main portion 23 which extends upwardly above the bar and in front of the grille and means 24 for securing the protector to the bumper bar 21, the major portion of the means 24 being disposed behind the bar so as to be out of sight.

In the preferred form of the invention the effective main portion 23 and the securing means 24 are, in the main, formed by a single piece of material by a few simple bending and forming operations. The material employed in the making of the protector preferably is spring steel in order to provide the desired strength, flat stock, shown in Figs. 1 to 4, being very suitable. As best seen in Fig. 1, the upstanding portion 23 has the general shape of an inverted V formed by imparting an edge bend to the piece of stock from which the protector is made substantially at the midpoint thereof. Near its end each leg of the inverted V is given an additional slight bend so as to terminate in a substantially vertical portion which extends downwardly behind the bumper bar 21 and carries the means 24 by means of which the protector is secured to the bumper bar. This securing means consists of an upper finger or hook 25 which extends forwardly from the plane of the upstanding portion 23 to engage over the upper edge of the bumper bar 21, a lower finger or hook 26 which also extends forwardly from the plane of the upstanding portion 23 to engage over the lower edge of the bumper bar 21, and a spring bow 27 for connecting the fingers 25 and 26. In the present instance, the finger 25 is drawn out of the stock to constitute an integral part thereof and is formed with a downwardly extending lip 28 for hooking over the upper edge of the bumper bar 21 and for forming a channel between the lip and the upstanding portion 23 of the protector in which the upper edge of the bumper bar is received. The spring bow 27 is formed by imparting to the vertical portion of each leg of the inverted V a right angular bend slightly below the finger 25 and then a reverse bend to result in a substantially U-shaped bow projecting rearwardly at right angles to the plane of the upright portion 23 and providing parallel horizontal portions 27a and 27b. The lower finger or hook 26 is carried by the free end of the spring bow 27 and, like the finger 25, is formed with an upwardly extending lip 29 to enable the finger to hook over the lower edge of the bar 21. Preferably the finger 26 is slightly recessed to provide a shoulder 30 forming with the lip 29 a channel in which the lower edge of the bumper bar is received.

In order to secure the protector rigidly to the bumper bar 21, apertures are formed in the horizontal portions 27a and 27b of the spring bow 27, and passed through the apertures is a bolt 31. This bolt has fixed on one end a hex nut 32 and threaded on the other end of the bolt is a nut 33 so that by threading the nut 33 onto the bolt 31 the spring bow 27 may be compressed and in that manner the fingers 25 and 26 will be drawn together into firm engagement with the bumper bar 21.

It will be apparent from the foregoing that the radiator grille protector described is of simple yet sturdy construction. Constructed as it is, it may be manufactured by a few simple bending and forming operations from a single piece of stock and thus can be economically manufactured. When completed, the attachment to a bumper bar is readily effected by any mechanic and when attached presents an extremely neat and attractive appearance because only the fingers 25 and 26 of the securing means are exposed to the view and on the whole the protector takes on the appearance of being an integral part of the bumper. Moreover, with the protector formed from a single piece of stock with the exception of the bolts 31, there are no rivets or joints to become loose and only the bolts 31 to become lost, and should these become lost they are readily replaced anywhere and any time since they are not special parts.

In Fig. 5 there is disclosed a modified form of the protector shown in Figs. 1 to 4 adapted to accommodate bumper bars 21 varying substantially in width. To that end the upstanding portion 23' and the spring bow 27' are still formed as integral parts with the lower finger 26' carried by the free end of the spring bow 27' but the upper finger 25' is now a separable member vertically adjustable toward or away from the finger 26' to vary the space between the fingers and thus the width of bumper bar 21 which may be received therebetween. To that end the vertical portion of each leg of the protector is formed with a slot 35 for the reception of a shank 36 of the finger 25'. The end of the shank 36 is threaded to receive a nut 37 for securing the finger 25' rigidly in its adjusted position. After the finger 25' has been adjusted to adapt the protector for the particular width of bumper bar to which the protector is to be attached, final gripping of the fingers 25' and 26' is still effected by the bolt 31' compressing the spring 27' to draw the fingers firmly into engagement with the bumper bar. It is to be noted that the stock employed in the manufacture of the protector is tubular, providing the maximum strength with the minimum weight and also facilitating the forming of the channel in the finger 26' since this is now readily done simply by compressing the tubular stock.

In Figs. 6 to 8, there is disclosed a third modification employing but a single means for securing the protector to the bumper bar. In this modification the protector still has an upstanding portion 23'' in the form of an inverted V with the legs of the V terminating in substantially vertical portions. These vertical portions, however, now lie entirely within the plane of the upstanding portion 23'' and are not bent laterally to form the spring bow of Figs. 1 to 5. In this modification, as previously stated, but a single securing means is employed and hence but a single spring bow 27'' is provided which is formed separately from the upstanding portion 23'' and is positioned intermediate the vertical portions of the upright portion 23''. This spring bow is of the same construction as that disclosed in Fig. 2 having a substantially U-shaped bow with parallel horizontal portions 27a'' and 27b'' and carrying an upper finger 25'' and a lower finger 26'' for engaging the top and bottom edges respectively of the bumper bar 21. The securing means is attached to the upright portion 23'' by means of a bar 39 which is secured at its ends in some suitable manner, such as by rivets 40, to the vertical portions of the upstanding portion 23'' and has secured intermediate its ends, as by bolts 41, the securing means 24''. The protector is again finally rigidly secured to the bumper bar 21 by means of a a bolt 31'' extending through the parallel portions 27a'' and 27b'' of the spring bow and serving to compress the same to cause the fingers firmly to grip the bumper bar 21.

Figs. 9 and 10 disclose an extremely simplified form of protector having an upstanding portion $23^3$ in the form of a single vertical strip or bar and a single securing means $24^3$. This securing means consists of the usual spring bow $27^3$ carrying an upper finger $25^3$ and a lower finger $26^3$ for engaging the upper and lower edges respectively of the bumper bar 21, and a bolt $31^3$ for compressing the spring bow to cause the fingers 25³ and 26³ firmly to grip the bumper bar 21. In the present instance, however, the spring bow is positioned more nearly intermediate the fingers 25³ and 26³ and there is depending from the spring bow a downwardly extending portion 44 disposed in the plane of the upstanding portion 23³.

In Figs. 11 and 12 there is shown a modified construction of radiator grille protector having an upstanding portion 23⁴ of a substantially inverted V-shape with each leg of the V terminating in a substantially vertical portion. Carried by each vertical portion is a means for securing the upstanding portion to the bumper bar 21. Herein this means comprises a hooked finger 25⁴ which is threaded into the vertical portion of the leg of the V and into a block 46 disposed behind the upstanding portion 23⁴. A hooked lower finger 26⁴ for engaging the lower edge of the bumper 21 passes through a vertical slot 47 in the upstanding portion 23⁴ and is threaded into a block 48 disposed behind the upstanding portion 23⁴. Extending through the blocks 46 and 48 is a bolt 31⁴ having a nut 33⁴ threaded on one end thereof by means of which the blocks may be drawn together and thereby draw the fingers together securely to clamp therebetween a bumper bar 21. It will be apparent that as an incident to the mounting of the lower finger 26⁴ the protector is attachable to bumper bars of varying width.

The radiator grille protector shown in Figs. 13 and 14 comprises an upstanding portion 23⁵ of generally inverted V-shape with each leg of the V terminating in a substantially vertical portion 50. As best seen in Fig. 14, there is bent reversely upon the portion 50 a portion 51 which forms one leg of a generally U-shaped spring bow 52, the leg 53 of which is parallel with the leg 51. This spring bow is vertically disposed with the open end downward and thus is adapted to receive within it a bumper bar 21 with the portion 51 lying over the front face of the bumper bar and the closed or top portion of the spring bow resting upon the upper edge of the bumper bar. In order to secure the protector firmly in the position in which it rests upon the bumper bar, there is threaded through the leg 53 a set screw 54 which bears against the rear face of the bumper bar 21 and thereby firmly secures the protector to the bumper bar. This construction is particularly advantageous in that it gives to the upstanding portion 23⁵ a yieldable construction permitting the protector to give slightly when engaged so as to cushion the impact and also prevent snapping off of the upstanding portion.

In Fig. 15 there is disclosed a form of protector in which bending and forming operations are reduced to a minimum and in which simple shearing and riveting operations are substituted. To that end the upstanding portion of the protector is composed of two straight strips 57 which are secured together at their upper ends by riveting to a plate 58 and at their lower ends are riveted to a cross bar 59 carrying centrally thereof a securing means 24⁶ such as that disclosed in Fig. 8. This spring bow has fingers 25⁶ and 26⁶ for engaging the upper and lower edges respectively of the bumper bar 21.

Fig. 18 discloses a protector of the type disclosed in Fig. 15, but inverted and slightly modified to adapt the protector for particular use with Ford V-8 automobiles. To that end the protector comprises strips 57' which are disposed to form a V, and to that end are riveted intermediate their ends to a cross bar 59' and extend downwardly below the cross bar and the bumper bar 21 and at their lower ends are secured together by means of riveting to a plate 58' and also extend above the bumper bar 21. The protector is secured to the bumper bar 21 by means of a securing means 24⁷ of the type disclosed in Fig. 8 having an upper finger 25⁷ and a lower finger 26⁷ for engaging the upper and lower edges respectively of the bumper bar 21.

The radiator grille protector disclosed in Figs. 16 and 17 is composed of two strips 57'' disposed in the form of an inverted V and secured at their upper ends by riveting to a plate 58'' and securing means 24⁸ formed as an integral part of each strip. The securing means 24⁸ are, like the securing means disclosed in the preferred form, composed of a spring bow 27⁸ formed by bending the strips 57'' laterally and an upper and a lower finger 25⁸ and 26⁸ connected by the spring bow and adapted respectively to engage the upper and lower edges of a bumper bar 21. A bolt 31⁸ passes through the spring bow for compressing the same to cause the fingers firmly to engage the edges of the bumper bar.

While the auxiliary attachment for bumper bars has here been described primarily as a radiator grille protector, it is believed apparent from the foregoing that the use is not limited to the protection of a radiator grille and it is not intended that the invention is to be limited to that use. On the contrary, the invention may be employed for the protection of fenders, rear trunks, and many other portions of an automotive vehicle not completely protected by the standard bumper bar. It is intended, therefore, to cover all modifications and uses of the invention falling within the spirit and scope of the invention as defined by the appended claims.

I claim as my invention:

1. An auxiliary attachment for a bumper bar or the like comprising a main portion extending laterally of the bar, and means for securing the attachment to the bar comprising a compressible means formed integral with said main portion and terminating at its free end in a hook adapted to engage over one edge of the bar, a slot in said main portion, a hooked finger mounted in said slot for adjustment toward or away from the hook to accommodate bars of different width, means for securing said finger in adjusted position, and means for compressing said compressible means to draw the finger and the hook into engagement with opposite edges of the bar to clamp the auxiliary attachment thereon.

2. An auxiliary attachment for a bumper bar or the like comprising a single piece of tubular stock providing a main portion adapted to extend laterally of the bar and near one end being bent laterally into a U-shape providing a compressible spring bow and compressed at the free end of the spring bow to provide a channel for the reception of one edge of the bar, a finger adjustably secured to the main portion opposite the channeled end having a lip to provide with the main portion a channel in which the opposite edge of the bar may be received, and a bolt extending through said spring bow operable to compress the spring bow to draw the finger and the free end of the spring bow into securing engagement with the edges of the bar.

3. An auxiliary attachment for a bumper bar or the like comprising a main portion adapted to extend laterally of the bumper bar and having a generally inverted V-shape, a cross bar connected between the ends of said main portion, and a means attached to said cross bar intermediate the ends thereof for securing said main portion to the bumper bar comprising a spring member terminating at its ends in oppositely disposed hooks adapted to engage over opposite edges of the bumper bar, and means for compressing said spring member to cause the hooks firmly to engage the bumper bar to clamp the attachment thereto.

4. An auxiliary attachment for a bumper bar or the like comprising a main portion adapted to extend laterally of the bar, a first finger extending through the main portion and engaging a block on the side of the main portion opposite the bar, said finger being hooked to adapt it for engaging over one edge of the bar, a slot in the main portion extending transversely of the bar, a second finger extending through the slot and into engagement with a block disposed on the side of the main portion opposite the bar, said second finger also being hooked to adapt it for engaging the opposite edge of the bar, and a bolt extending through said blocks and operable to draw said blocks and said fingers toward one another to clamp the attachment onto the bar.

5. An auxiliary attachment for a bumper bar or the like comprising a single piece of stock bent intermediate its ends into an inverted V-shape and at each end being successively reversely bent upon itself to form a spring bow adapted to fit over an edge of the bar, and a screw threaded into the free end of the spring bow adapted to engage the bar received in the spring bow to secure the attachment onto the bar.

6. An auxiliary attachment for a bumper bar or the like comprising a plurality of strips secured together in the form of a V, a cross bar secured to said strips intermediate the ends thereof, and means secured to said cross bars for attaching said attachment to the bumper bar comprising a compressible spring member having a general U-shape, a hook carried by one end of said spring member adapted to engage over one edge of the bumper bar, a second hook carried by the other end of said member disposed opposite said first hook and adapted to engage over the opposite edge of the bumper bar, one end only of said spring member being secured to said cross bar, and means for compressing said spring member and retaining the same compressed for clamping the attachment to the bumper bar by means of said hooks.

7. An auxiliary attachment for a bumper bar or the like comprising a single metallic bar formed to have an intermediate portion adapted to upstand from the bumper bar and provide a vertical forward surface, parallel end portions adapted to be disposed behind the bumper bar and spaced laterally to form a wide base, each of said end portions being formed into securing means for said attachment and comprising a first forward extension terminating in a hook adapted to engage the upper edge of the bumper bar, a second forward extension disposed opposite said first extension and terminating in a hook adapted to engage the lower edge of the bumper bar, the part of each of said end portions intermediate said extensions forming a spring bow compressible in a plane transversely of the bumper bar, and means for compressing the spring bow to cause the extensions firmly to engage the edges of the bumper bar to secure the auxiliary attachment firmly thereto.

8. An auxiliary attachment for a bumper bar or the like comprising a single metallic bar formed to have an intermediate portion adapted to upstand from the bumper bar and provide a vertical forward surface, parallel end portions adapted to be disposed behind the bumper bar and spaced laterally to form a wide base, each of said end portions being formed into securing means for said attachment and comprising a first forward extension terminating in a wide mouthed shallow hook adapted to engage the upper edge of the bumper bar, a second forward extension disposed opposite said first extension and terminating in a wide mouthed and shallow hook adapted to engage the lower edge of the bumper bar, the part of each said end portions intermediate said extensions forming a spring bow compressible in a plane transversely of the bumper bar, and a bolt passing through the legs of the spring bow intermediate the closed end of the bow and the extensions for compressing the spring bow to cause the extensions firmly to engage the edges of the bumper bar to secure the auxiliary attachment firmly thereto.

9. An auxiliary attachment for a bumper bar or the like comprising a bar-like element formed to have an intermediate portion adapted to upstand from the bumper bar and end portions adapted to be disposed behind the bumper bar in laterally spaced relation to provide a wide base for the attachment, each end portion being bent to form a rearwardly extending U-shaped spring bow compressible in a plane transversely of the bumper bar and terminating at the free end in a forwardly extending hook adapted to engage the lower edge of the bumper bar, a second forwardly extending hook secured to said element near the point of merging of the end portion and the intermediate portion disposed opposite said first hook to engage the upper edge of the bumper bar, and means for compressing the spring bow to cause the extensions firmly to engage the edges of the bumper bar to secure the auxiliary attachment firmly thereto.

EDWIN BAGNALL.